United States Patent [19]

McIntosh

[11] Patent Number: 5,584,317

[45] Date of Patent: Dec. 17, 1996

[54] LINED MANHOLE AND METHOD OF MAKING SAME

[76] Inventor: Robert G. McIntosh, 26076-31B Avenue, Aldergrove, British Columbia, Canada, V4W 2Z6

[21] Appl. No.: 570,798

[22] Filed: Dec. 12, 1995

Related U.S. Application Data

[63] Continuation of Ser. No. 231,306, Apr. 22, 1994, abandoned.

[51] Int. Cl.[6] ........................................................ F16L 5/00
[52] U.S. Cl. ................................... 137/363; 52/20; 52/21
[58] Field of Search ............................... 137/363, 364; 52/20, 21

[56] References Cited

U.S. PATENT DOCUMENTS

| | | |
|---|---|---|
| 1,463,461 | 7/1923 | Davis . |
| 1,706,811 | 3/1929 | Pearson et al. . |
| 1,712,510 | 5/1929 | Monie . |
| 2,457,418 | 12/1948 | Turpin et al. . |
| 2,798,504 | 7/1957 | Gast . |
| 3,403,703 | 10/1968 | Reimann ................................ 137/363 |
| 4,253,282 | 3/1981 | Swartz .................................. 137/363 |
| 4,275,757 | 6/1981 | Singer .................................. 137/363 |
| 4,341,236 | 7/1982 | LaBenz ................................. 137/363 |
| 4,346,921 | 8/1982 | Gill et al. .............................. 52/20 |
| 4,483,643 | 11/1984 | Guggemos ............................ 405/154 |
| 4,919,564 | 4/1990 | Neathery et al. ..................... 404/25 |
| 5,046,886 | 9/1991 | Muir et al. ........................... 404/25 |
| 5,066,165 | 11/1991 | Wofford et al. ...................... 404/4 |
| 5,213,438 | 5/1993 | Bärenwald ........................... 404/2 |

FOREIGN PATENT DOCUMENTS

| | | |
|---|---|---|
| 352887 | 1/1982 | Austria . |
| 1172052 | 8/1984 | Canada .................................. 61/28 |
| 50474 | of 1910 | Switzerland ........................... 404/2 |
| 22187 | of 1909 | United Kingdom .................... 52/20 |
| 1363302 | 8/1974 | United Kingdom .................. 137/363 |

OTHER PUBLICATIONS

*Sweet's General Building and Renovation 1993 Catalog File* Section 02 725—Aco Drain Co. p. 3; model FG 100, 1993.
Greenstreak Brochure: "Form Liners for Architectural Concrete", 1986.
NPC Inc., Assembly/Specification Sheets: "Kor–N–Seal 1 & 400 Flexible Pipe-to-Manhole Connector", Jun., 1987.

(List continued on next page.)

Primary Examiner—A. Michael Chambers
Attorney, Agent, or Firm—Fetherstonhaugh & Co.

[57] ABSTRACT

A manhole base comprising a benching portion, an annular wall portion surrounding the benching portion and extending axially therefrom, the annular wall portion having inside and outside surfaces and at least two angularly spaced apart passages extending through the annular wall portion, each passage having inner and outer portions respectively, the inner and outer portions being disposed within the annular wall portion, the inner portions having respective inner openings in the inside surface and the outer portions having respective outer openings in the outer surface, the inner and outer openings being in communication with their respective passages. There is at least one canal in the benching portion for connecting at least two of the passages in communication with each other, the canal having an open top portion. There is also a canal liner having an open canal portion lying in the canal and having end portions lying in respective inner portions of respective passages, the end portions being in communication with the canal portion. The canal liner also has pipe connectors connected to respective end portions for connecting pipes to respective end portions of the canal liner, the pipe connectors having respective circular edges disposed between the inside and outside surfaces of the annular wall portion such that sufficient space is provided between the circular edges and the outer opening to permit installation of gaskets in the outer openings for sealing areas between connecting pipes connected to the pipe connectors and the manhole base such that in use, ground water is prevented from contacting the circular edges.

11 Claims, 8 Drawing Sheets

OTHER PUBLICATIONS

Conap, Inc., Technical Data Sheet for "Conthane TU–65 Polyurethane Casting System", 1989.

Stag Sealants and Polymers Inc.: "Moldform Urethane Elastomers", 1992.

Gu–Manhole Liners Ltd., Data Sheets showing rigid prefabricated manhole liners and manhole units respectively, 1989.

A Lok Products Inc. Data Sheet for Tru–Contour Secondary Invert Forming System—Copyright 1988.

LINED MANHOLE AND METHOD OF MAKING SAME

This is a continuation of application Ser. No. 08/231,306, filed Apr. 22, 1994, now abandoned.

BACKGROUND OF THE INVENTION

This invention relates to manhole bases having sewer pipe connections sealed by gaskets between the sewer pipes and the manhole base.

Improvements have been made in manhole bases by lining the fluid conducting portions thereof. One example of such an improvement is described in U.S. Pat. No. 4,483,643 to Guggemos, which describes a canal bed shell having an open channel portion and pipe connecting portions. Unfortunately, edges of the channel portion and edges of the pipe connecting portions are exposed when installed in a manhole base and therefore, sewer fluids may ingress at the interface of the canal bed shell and a benching portion of the manhole base and ground water may ingress at the interface of the pipe connecting portion edges and the manhole base. Ingress of fluids in this manner can corrode the seating of the canal bed shell in the manhole base, ultimately destroying it. The manhole base can be refurbished by chipping out the canal bed shell but this can be difficult in bases where the entire benching and canal portions are lined.

In addition, the canal bed shell of the type described by Guggemos has fixed pipe connecting portions which extend through the circular wall of the manhole base and which are embedded in the concrete of the manhole base. Typically, these canal bed shells are embedded in the concrete at a factory and the entire base is shipped to the job site. The cost of shipping such bases can be quite expensive.

What would be desirable, is a manhole base which can be manufactured right at the job site and used to form a sewer system node which will resist the effects of groundwater pressure acting on the manhole base and which will resist corrosion of the manhole base under such conditions. In addition, there is a need for an on-site manufacturable manhole base which can connect to inlet and outlet sewer pipes which may be disposed at non-standard angles relative to the manhole base. The present invention addresses the above needs.

SUMMARY OF THE INVENTION

According to one aspect of the invention there is provided a manhole base comprising a benching portion, an annular wall portion surrounding the benching portion and extending axially therefrom, the annular wall portion having inside and outside surfaces and at least two angularly spaced apart passages extending through the annular wall portion, each passage having inner and outer portions respectively, the inner and outer portions being disposed within the annular wall portion, the inner portions having respective inner openings in the inside surface and the outer portions having respective outer openings in the outer surface, the inner and outer openings being in communication with their respective passages. There is at least one canal in the benching portion for connecting at least two of the passages in communication with each other, the canal having an open top portion. There is also a canal liner having an open canal portion lying in the canal and having end portions lying in respective inner portions of respective passages, the end portions being in communication with the canal portion. The canal liner also has pipe connectors connected to respective end portions for connecting pipes to respective end portions of the canal liner, the pipe connectors having respective circular edges disposed between the inside and outside surfaces of the annular wall portion such that sufficient space is provided between the circular edges and the outer opening to permit installation of gaskets in the outer openings for sealing areas between connecting pipes connected to the pipe connectors and the manhole base such that in use, ground water is prevented from contacting the circular edges.

Preferably, the end portions of the canal liner have cylindrical pipe receiving portions, the circular edges being on the cylindrical pipe receiving portions.

Preferably, the pipe connectors include the cylindrical pipe receiving portions and the cylindrical pipe receiving portions have enlarged pipe bell portions for receiving end portions of respective connecting pipes such that fluid flow in the connecting pipes is substantially undisturbed during passage from the connecting pipe to the canal liner.

Optionally, the apparatus may include at least one transition conduit connected to one of the end portions, the transition conduit having a liner connecting portion and a pipe connecting portion respectively, the liner connecting portion having a first axis and the pipe connecting portion having a second axis, the first and second axes being disposed at an angle relative to each other to permit a connecting pipe having an axis not in alignment with the axis of the canal liner to be connected to the canal liner.

Optionally, at least one of the passages has an outer portion which is disposed at an angle relative to the inner portion such that the outer portion of the passage is operable to receive an end portion of a pipe which is not in axial alignment with the axis of the canal portion. Preferably, the circular edge is located on the pipe connecting portion of the transition conduit.

Preferably, the canal liner has first and second laterally extending flanges extending laterally outwardly from the canal portion and embedded in the benching portion of the manhole base.

According to a further aspect of the invention there is provided a method of making a manhole base, the method comprising the steps of:

a) placing and holding a combination manhole canal form and liner adjacent an inside form such that first and second upstanding edges thereof are adjacent the inside form;

b) placing and holding bell mandrels inside respective end portions of the canal form and liner such that respective outer portions of the bell mandrels are operable to contact an inside wall of an outside form placed about the inside form; and c) placing and curing a castable substance about the canal form and liner and between the inside and outside forms to produce a solidified structure having passages formed by the bell mandrels.

Preferably, the method includes the step of setting a grade between at least two end portions.

Optionally, the method includes the step of placing a support between the canal liner and the inside form, such that the canal liner is disposed at an angle relative to the inside form.

Optionally, the method includes the step of rotating at least one of the first and second bell mandrels until an outer axis of the at least one bell mandrel is disposed at a desired angle relative to the inner wall of the outside form.

Preferably, the method includes the step of securing tie straps between the canal form and liner such that the canal form and liner are snugly held adjacent the inside form such that the inside form is operable to be turned upside down while the canal form and liner is held adjacent the inside form.

Optionally, the method includes the step of engaging hooks on the tie straps with the mandrels.

Preferably, the method includes the step of suspending the inside form with the canal form and liner secured thereto, from the outside form.

Preferably, the method includes the step of forming a benching portion from an inside wall of the manhole base to the canal portion of the canal form and liner before the castable substance has substantially solidified.

According to a further aspect of the invention there is provided a method of forming a lined manhole base, the method comprising the steps of:

a) placing a centre form on a surface;

b) placing on the centre form, an inside canal liner support;

c) placing on the inside canal liner support a canal liner including a unitary body having at least two end portions and an open canal portion having a fluid conducting surface for conducting fluid from one end portion to another, the end portions having respective longitudinal axes;

d) placing a liner connecting portion of a transition conduit in at least one end portion such that a pipe connecting portion thereof is operable to receive an end portion of a pipe, the connecting portion having a first axis and the pipe connecting portion having a second axis, the first and second axes being disposed at an angle relative to each other to permit a connecting pipe having an axis not in alignment with the axis of the canal liner to be connected to the canal liner.

e) moving the transition conduits until the second axis is aligned with and intended connecting pipe axis;

f) placing first and second bell mandrels in the first and second transition conduits respectively;

g) placing an outside concrete form about the centre form, unitary body, transition conduits, and bell mandrels such that the outside form defines a bounded area to be filled with concrete;

h) pouring concrete into the bounded area; and i) curing the concrete into a solid body.

Optionally, the method includes the step of securing the first and second transition conduits in aligned positions, with an adhesive.

According to a further aspect of the invention there is provided a sewer system node comprising:

a) an inlet pipe having an inlet end portion;

b) an outlet pipe having an outlet end portion;

c) a manhole including a manhole base comprising:

i) a benching portion;

ii) an annular wall portion surrounding the benching portion and extending axially therefrom, the annular wall portion having inside and outside surfaces;

iii) first and second angularly spaced apart passages extending through the annular wall portion, each passage having inner and outer portions respectively, the inner and outer portions being disposed within the annular wall portion, the inner portions having respective inner openings in the inside surface and the outer portions having respective outer openings in the outer surface;

iv) at least one canal in the benching portion for connecting at the first and second passages in communication with each other, the canal having an open top portion;

v) a canal liner having an open canal portion lying in the canal and end portions lying in respective inner portions of respective passages, the end portions being in communication with the canal portion;

vi) first and second pipe connectors connected to the first and second end portions of the canal liner respectively, for connecting the inlet and outlet end portions of the first and second pipes respectively, to the canal liner, the pipe connectors having respective circular edges disposed between the inside and outside surfaces of the annular wall portion such that sufficient space is provided between the circular edges and respective outer openings to permit installation of gaskets in the outer openings for sealing areas between the inlet and outlet end portions and the manhole base such that in use, ground water is prevented from contacting the circular edges.

Preferably, the apparatus includes first and second gaskets disposed in the first and second passages respectively, between the respective circular edges and the outer wall and extending about the inlet end portion and the outlet end portion respectively to prevent ingress of fluid between the inlet end portion and the first passage wall and between the outlet end portion and the second passage wall respectively.

BRIEF DESCRIPTION OF THE DRAWINGS

In drawings which illustrate embodiments of the invention.

DETAILED DESCRIPTION

First Embodiment

FIG. 1

Figure 1:
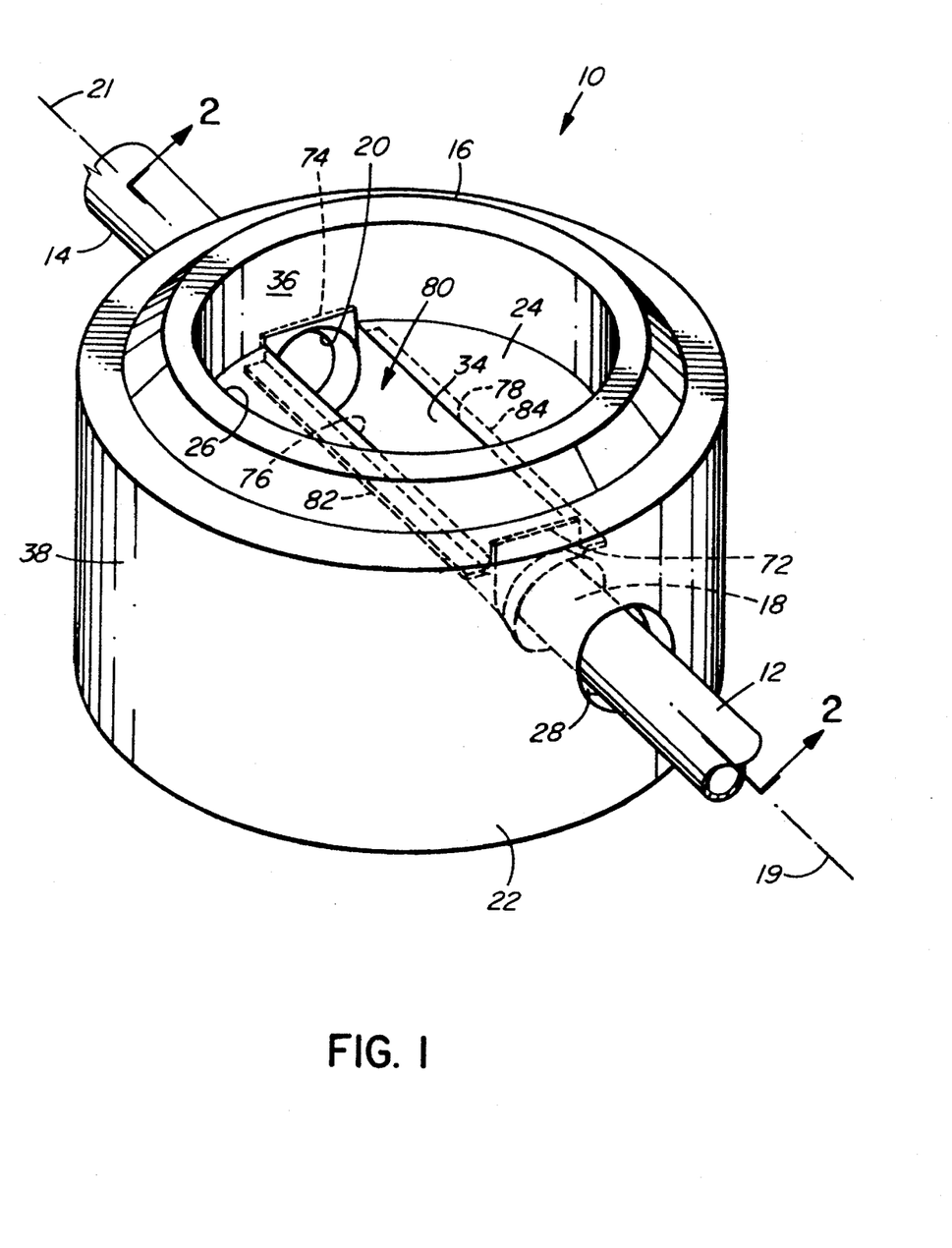
FIG. 1 is a perspective view of a manhole base according to a first embodiment of the invention.
Figure 2:
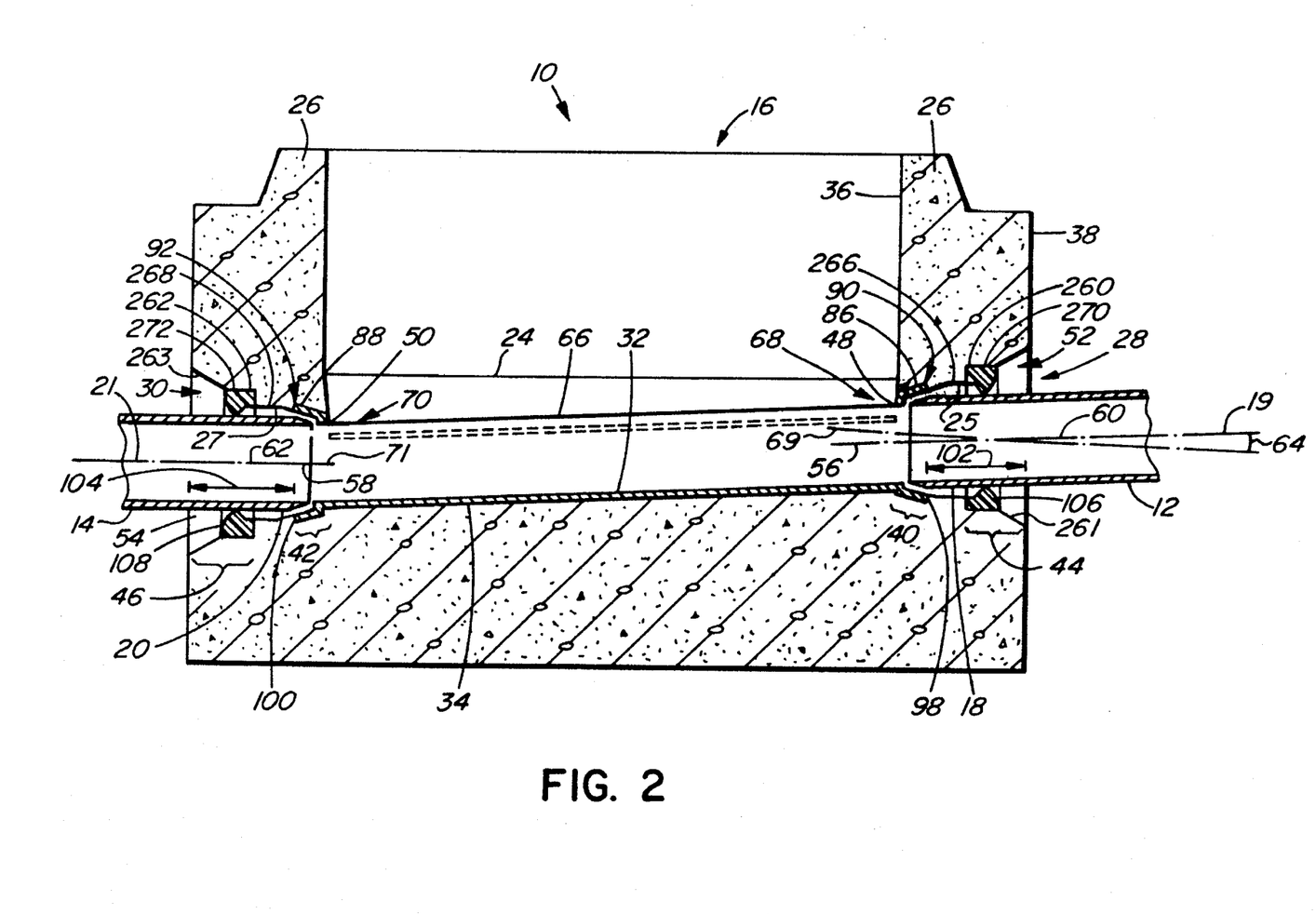
FIG. 2 is a cross-sectional view of the manhole base of FIG. 1.

Referring to FIGS. 1 and 2, a sewer system node according to a first embodiment of the invention is shown generally at 10. The sewer system node includes an inlet pipe 12, an outlet pipe 14 and a manhole 16.

The inlet pipe 12 has an inlet end portion 18 and the outlet pipe 14 has an outlet end portion 20. Each pipe is straight and has a respective pipe axis 19 and 21.

FIG. 2

The manhole 16 includes a manhole base 22 formed from a solidified aggregate such as concrete, in a generally circular form. The base has an inclined benching portion 24, an annular wall portion 26 surrounding the benching portion and extending axially therefrom, first and second angularly spaced apart passages 28 and 30 extending through the annular wall portion, a canal 32 in the benching portion for connecting the first and second passages in fluid communication with each other, and a canal liner 34 for lining the canal to prevent stagnant or turbulent water containing sulfides or other concrete corrosive chemicals from contacting and corroding the canal 32.

The annular wall portion 26 has inside and outside surfaces 36 and 38 respectively.

Passages

The first and second angularly spaced apart passages 28 and 30 are defined by respective cylindrical walls 25 and 27 which extend through the annular wall portion 26. In this embodiment, the passages are angularly spaced apart at 180 degrees. Each passage has inner and outer portions 40, 42 and outer portions 44, 46 respectively. The inner and outer portions are disposed within the annular wall portion 26.

The inner portions 40 and 42 have respective inner openings 48 and 50 respectively in the inside surface 36 and the outer portions 44 and 46 have respective outer openings 52 and 54 respectively in the outside surface 38. The inner portions 40 and 42 have respective inner axes 56 and 58 and the outer portions 44 and 46 have respective outer axes 60 and 62.

In this embodiment the outer axis 60 of the outer portion 44 of the first passage 28, is disposed at an angle 64 relative to the inner axis 56 of the inner portion, such that the outer portion 44 of the first passage 28 is operable to receive the inlet end portion 18 of the inlet pipe 12, where the pipe axis 19 is not in axial alignment with the inner axis 56 of the inner portion 40. The inner and outer axes 58 and 62 of the second passage 30 are aligned and coincident in the embodiment shown.

Canal Liner

The canal liner 34 is formed from fibreglass and has an open canal portion 66 and has first and second end portions 68 and 70 in communication with the canal portion. The end portions and canal portion have respective fluid conducting surfaces which provide a constant friction coefficient to fluid flowing therein. The first and second end portions have respective axes 69 and 71 which are coincident with the inner axes 56 and 58. It will be appreciated that the canal liner may have more than two end portions and a plurality of tributaries in communication with each other.

Referring back to FIG. 1, the canal portion 66 has first, second, third and fourth upstanding edges 72, 74, 76, 78 defining a rectangular opening 80. The canal portion also has first and second laterally extending flanges 82 and 84 extending laterally outwardly therefrom and embedded in the benching portion 24 of the manhole base 22. These flanges help secure the canal liner in the manhole base as they are embedded in concrete.

Referring back to FIG. 2, the end portions 68 and 70 lie in respective inner portions 40 and 42 of respective passages 28 and 30 and have first and second pipe connectors 86 and 88 thereon, for connecting to the canal liner 34 the inlet and outlet end portions 18 and 20 respectively. The pipe connectors 86 and 88 have flared cylindrical pipe receiving portions 90 and 92 which act as enlarged pipe bell portions for receiving the respective inlet and outlet end portions 18 and 20. This ensures that fluid flow in the inlet and outlet pipes 12 and 14 is substantially undisturbed during passage into or out of the canal liner 34. The flared cylindrical pipe receiving portions 90 and 92 permit a limited degree of movement of the inlet and outlet end portions relative to the canal liner such that the manhole base is capable of receiving inlet and outlet pipe end portions which may not have axes exactly in alignment with corresponding axes 69, 71 of the first and second end portions.

The flared cylindrical pipe receiving portions 90 and 92 have respective circular edges 98 and 100 disposed between the inside and outside surfaces 36 and 38 of the annular wall portion 26 such that sufficient spaces 102 and 104 are provided between the circular edges 98, 100 and respective outer openings 52 and 54 to permit installation of first and second O-shaped gaskets 106 and 108 respectively in the first and second outer portions 44 and 46 respectively. The circular edges 98 and 100 define the boundary between inner and outer portions 40, 42 and 44, 46 of the first and second passages 28 and 30 respectively.

Each outer portion has a respective gasket seat portion 260, 262 and a flared portion 261 and 263. The gasket seat portions have respective shoulder portions 266, 268 extending radially outwardly of respective circular edges 98, 100 and have a cylindrical wall portion 270, 272 extending axially outwardly from respective shoulder portions. Distal end portions of the cylindrical wall portions transform into respective flared portions 261 and 263. The flared portions 261 and 263 act to provide access to the liner end portions 68 and 70 respectively while the gasket seat portions 260 and 262 act to provide respective seats for the first and second O-shaped gaskets 106 and 108. The inlet end portion 18 and the outlet end portion 20 of the inlet and outlet pipes 12 and 14 respectively are inserted into the O shaped gaskets and into the flared cylindrical pipe receiving portions 90 and 92 respectively and are secured therein by adhesive in the conventional manner. The first and second O-shaped gaskets 106 and 108 extend about the respective end portions of the pipes 12 and 14 and seal the areas between the outer walls of the pipes and the outer portions 44 and 46 of the first and second passages 28 and 30 respectively. Thus ground water in areas adjacent the outside surface 38 and the outer walls of the pipes is prevented from entering the outer portions of the first and second passages 28 and 30 and is prevented from ingress between the transition conduits, canal liner and the manhole base. Thus the manhole base is protected from decay and corrosion due to ground water. Hence the manhole has a longer life and requires less maintenance.

The above described apparatus is particularly effective for preventing ingress of groundwater between the canal liner and the manhole base in areas where ground water may have a substantial head resulting in pressurized groundwater impinging upon the manhole base.

Method of Manufacture

FIG. 3

Figure 3:
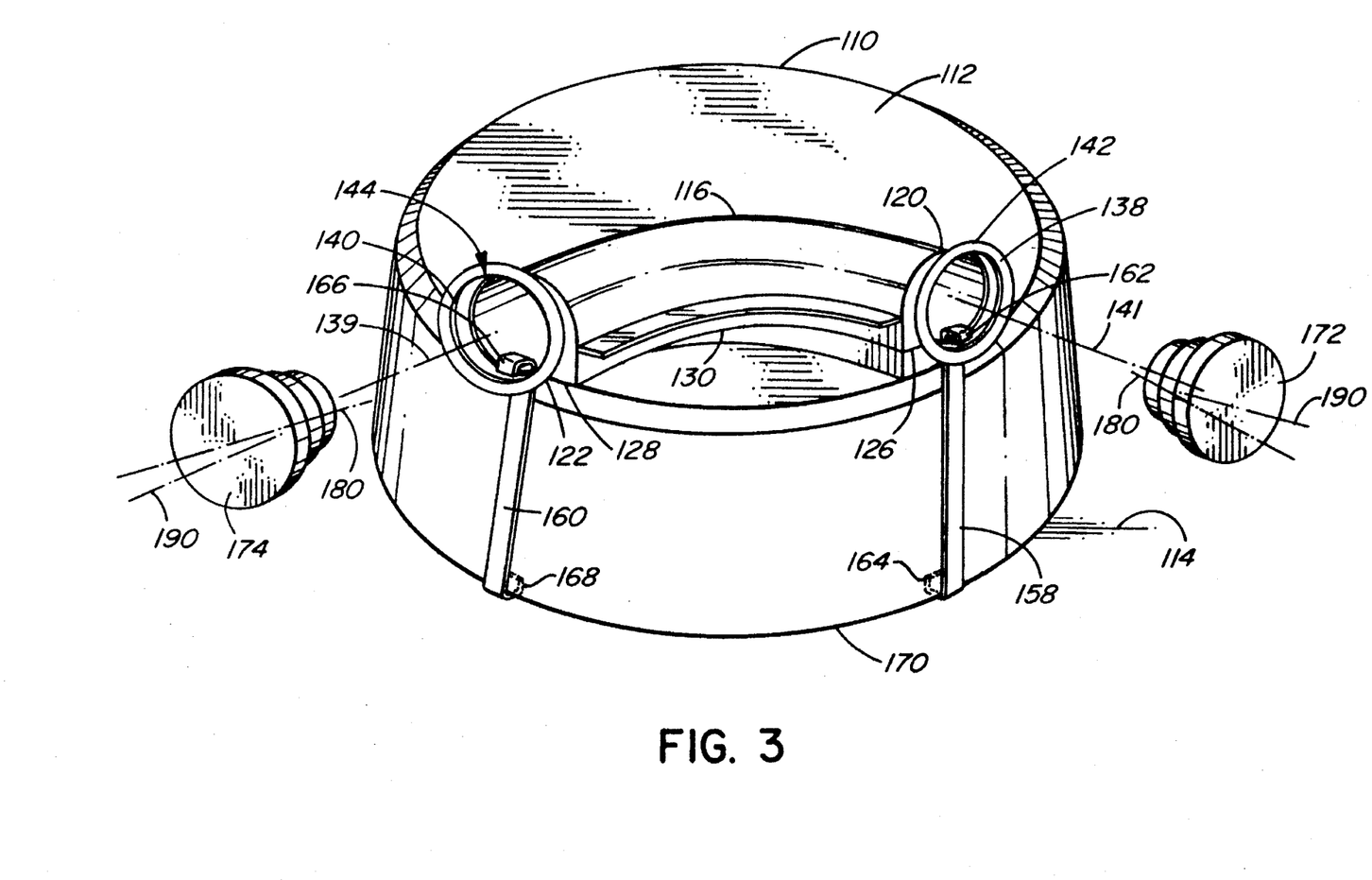
FIG. 3 is a perspective view of a canal liner placed on an inside form according to a method of making a manhole base according to the invention.

Referring to FIG. 3, in order to make a manhole base similar to that described above, a circular cylindrical inside form 110 having a circular flat surface 112 is first placed flat on a floor surface 114.

FIG. 4

Figure 4:
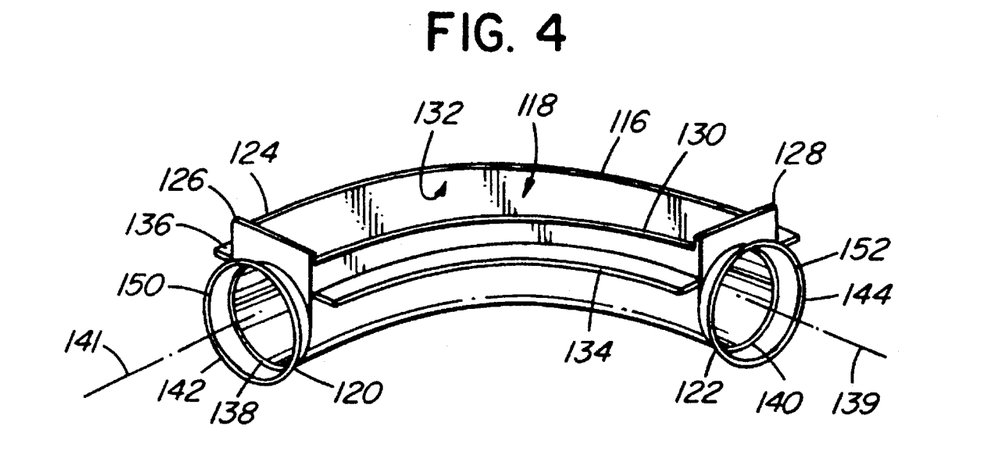
FIG. 4 is a perspective view of the canal liner of FIG. 3.

Referring to FIG. 4, a canal form and liner 116, in this embodiment having an arcuate shape, will line the canal portion of the manhole base ultimately formed. The canal liner 116 has an open canal portion 118 and has first and second end portions 120 and 122 in communication with the canal portion. The canal portion 118 has first, second, third and fourth upstanding edges 124, 126, 128, and 130 defining an arcuate shaped opening 132 and has first and second laterally extending flanges 134 and 136 extending laterally outwardly therefrom. These flanges will ultimately be embedded in the benching portion of the manhole base to help secure the canal liner in the manhole base.

The end portions 120 and 122 will ultimately lie in respective inner portions of respective passages in the manhole base and have first and second pipe connectors 138 and 140 thereon, for connecting to the canal liner 116 inlet and outlet end portions (not shown) of respective inlet and outlet pipes (not shown) respectively. The pipe connectors 138 and 140 have first and second axes 139 and 141 respectively and include first and second flared cylindrical pipe receiving portions 142 and 144 which act as enlarged pipe bell portions for receiving the respective inlet and outlet end portions of cooperating pipes.

The flared cylindrical pipe receiving portions 142 and 144 have respective circular edges 150 and 152 which will ultimately be disposed between inside and outside surfaces of an annular wall portion of the manhole base ultimately formed.

Referring back to FIG. 3, the canal liner 116 is placed upside down on the circular flat surface 112 such that the upstanding edges thereof, only three of which are shown at 126, 128 and 130 are facing the circular flat surface.

FIG. 5

Figure 5:
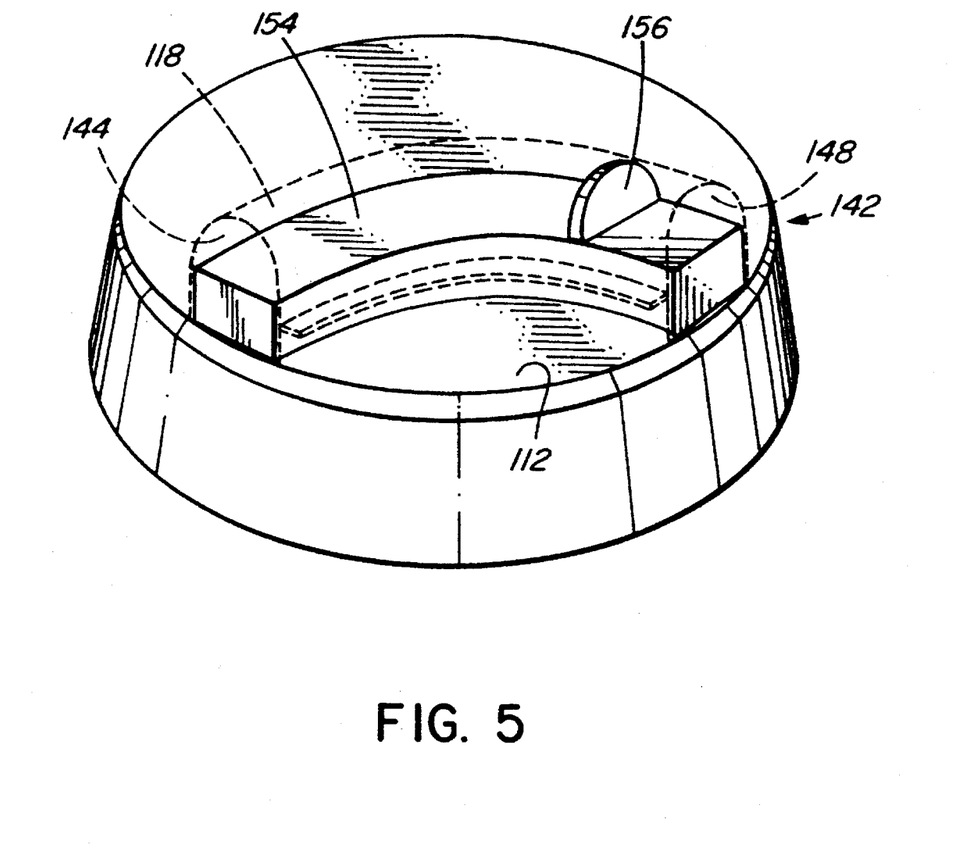
FIG. 5 is a perspective view of an arcuate block of styrofoam and a riser block for setting a grade between opposite end portions of the canal liner of FIG. 4, installed on the inside form shown in FIG. 3.

Referring to FIG. 5, if a grade is required between the first pipe receiving portion 142 and the second pipe receiving portion 144, an arcuate block of styrofoam 154 is first placed on the surface 112 and a riser block formed of similar material is placed on the block such that it and at least a portion of the styrofoam 154 are received in the canal portion 118.

Referring back to FIG. 3, the riser block is dimensioned to hold the upstanding edge 126 and the first end portion 120 off of the surface 112, while the upstanding edge 128 and the second end portion 122 rest on the surface 112. The styrofoam block 154 is dimensioned to completely fill the space between the upstanding edges 124, 128, 130 and the surface 112 such that during a later stage of manufacture, concrete is prevented from entering the canal portion 118. In effect, the act of placing the styrofoam block and riser block as described amounts to placing a support between the canal liner and the inside form, such that the canal liner is disposed at an angle relative to the inside form. Thus, the styrofoam block 154 and riser block 156 act to set a grade between the two end portions of the canal liner in the manhole ultimately formed.

Next, still referring to FIG. 3, first and second bell mandrels 172 and 174 are secured to the pipe connectors 138 and 140. The first and second bell mandrels act to form the outer portions of passages in the manhole base ultimately formed.

FIG. 6

Figure 6:
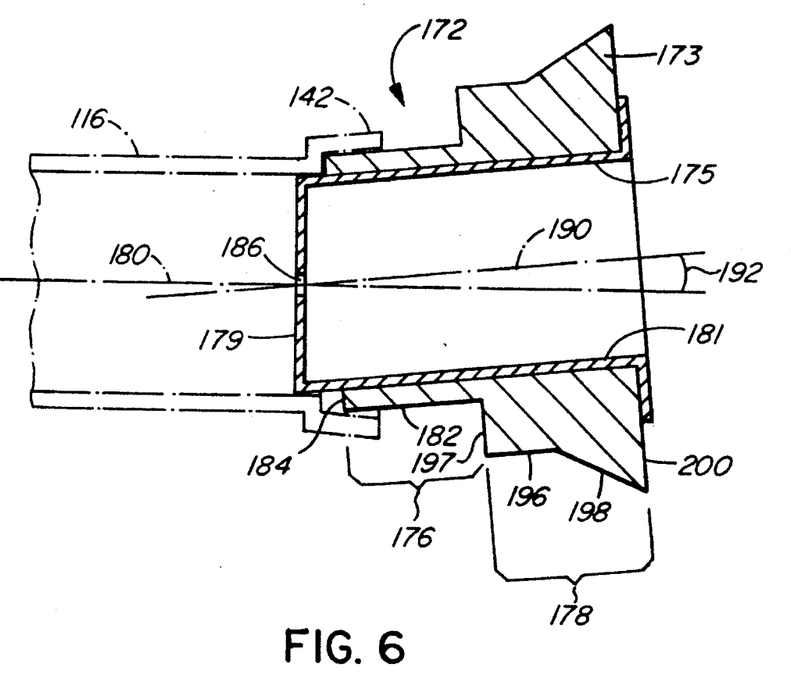
FIG. 6 is a side elevation of a bell mandrel for use according to the method of making the base according to the invention.

Referring to FIG. 6, the first bell mandrel is shown generally at 172 and includes an annular rubber portion 173 and a circular form portion 175. The annular rubber portion has a canal connecting portion 176, and a receptacle forming portion 178. The canal connecting portion 176 has a circular cylindrical portion 182 having suitable dimensions rendering it operable to be received in the flared cylindrical pipe receiving portions 142 or 144 of the canal liner 116 of FIG. 3. The circular cylindrical portion is terminated in an annularly circular flat surface 184.

The receptacle forming portion includes a circular cylindrical gasket seat forming portion 196 having a diameter slightly larger than the diameter of the canal connecting portion 182 and terminating in an annular surface 197. The annular surface 197 forms the shoulder portion 266, 268 and the gasket seat forming portion 196 forms the cylindrical wall portion 270, 272 of the base ultimately formed.

The receptacle forming portion further includes a truncated conical flared portion 198 terminated in a flat annulur surface 200. The flared portion acts to form the truncated conical flared portions 261 and 263 in the manhole base for ease in inserting a pipe into the passage ultimately formed in the manhole base.

The circular form portion 175 is received in a central opening in the rubber portion 173 and includes an end wall 179 symmetrical about a first axis 180 and a cylindrical wall 181 symmetrical about a transition axis 190 disposed at an angle 192 to the first axis 180. In this embodiment, the angle 192 is 5 degrees.

It will be appreciated that other mandrels may have aligned first and transition axes 180 and 190 or may have axes which are disposed at angles greater than or less than 5 degrees. The application will dictate the required angle.

The end wall has an opening 186 for engaging a hook for holding the rubber portion and circular form in position as shown in FIG. 6.

Generally for the discussion to follow, the rubber portion 173 and the circular form 175 will be referred to as a single unit henceforth referred to as a bell mandrell.

Referring back to FIG. 3, once having selected appropriately angled bell mandrels, the first and second bell mandrels 172 and 174 are rotated about their respective first axes 180 until the desired angular orientations of the transition axes 190 relative to the axes 139 and 141 of the pipe connectors 138 and 140 is achieved, to suit the intended installation of the manhole base, keeping in mind that the manhole base should be visualized upside down as this will be its ultimate orientation.

Still referring to FIG. 3, the canal liner 116 is then secured to the inside form 110 by first and second tie straps 158 and 160 each having respective end portions with hooks 162, 164 and 166, 168 thereon. The hooks 162 and 166 are engaged with the openings 186 on the first and second bell mandrels 172 and 174 respectively while the hooks 164 and 168 are engaged with an edge 170 of the inside form. Conventional tightening buckles are provided to allow the tie straps to be tightened such that the bell mandrels are securely held in respective pipe connectors and such that simultaneously the canal liner 116 is held securely to the surface 112. The straps hold the canal liner sufficiently snugly adjacent the circular flat surface 112 such that the inside form 110 can be turned upside down without fear of the canal liner 116 parting from the inside form 110.

The bell mandrels 172 and 174 are then oiled to prevent concrete from adhering to them during later stages of manufacture.

FIG. 7

Figure 7:
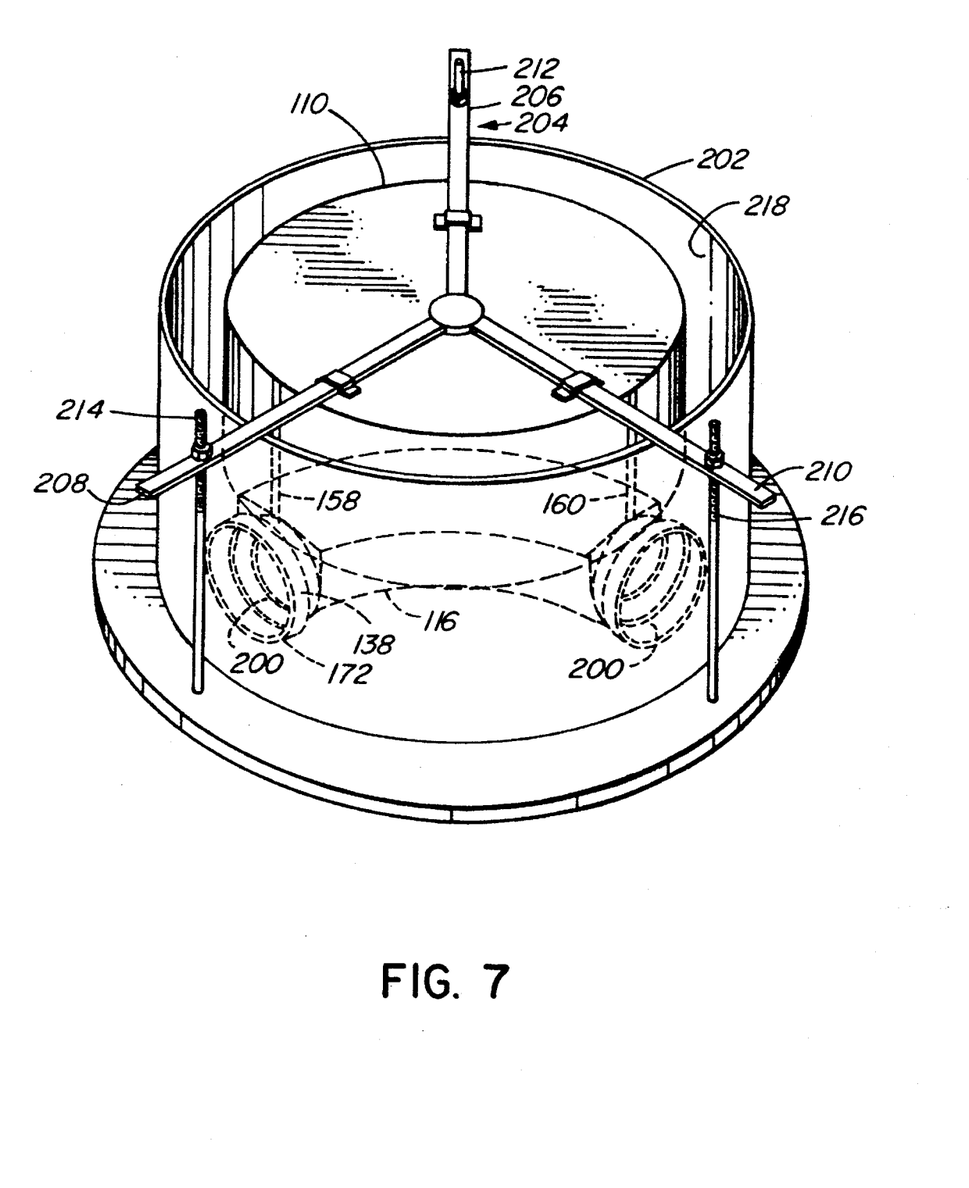
FIG. 7 is a perspective view of the apparatus of FIG. 3 shown inverted and suspended inside an outside form in accordance with the method for making the manhole base according to the invention.

Referring to FIG. 7, the inside form 110, with canal liner 116 attached, is turned upside down and is suspended inside an outside form 202 by a support assembly shown generally at 204. In this embodiment, the support assembly 204 includes first, second and third arms 206, 208 and 210 connected together and diverging radially at equal angles and having respective distal end portions engaged with respective threaded rods 212, 214 and 216 secured to the outside form 202. The support assembly serves to hold the inside form and canal liner in place relative to the outside form.

The outside form 202 has an inner wall 218 which ultimately defines an outer wall of the completed manhole base. Since openings are required in the manhole base, for receiving respective pipes therein, care must previously be taken to ensure that the canal liner 116 is positioned on the inside form 110 such that the circular surfaces 200 of the first and second bell mandrels 172 and 174 respectively will be in contact with the inner wall 218 when the outside form is properly positioned about the inside form as shown in FIG. 7.

With the outside form 202 properly positioned about the inside form 110, a castable substance such as dry-cast concrete is placed in the spaces defined by and between the inside and outside forms 110 and 212, and about the canal liner 116 and first and second bell mandrels 172 and 174. Preferably, the outside form 202 is removed from the inside form 110 shortly after the dry-cast concrete has been placed and before the dry cast concrete has substantially solidified.

After removing the outside form 202, the tie straps 158 and 160 are removed from the inside form 110 and the inside form is removed from the partially solidified manhole base. The first and second bell mandrels 172 and 174 are then removed from the pipe connectors 138 and 140 before the dry cast concrete has substantially solidified. In addition, the styrofoam block and riser 154 and 156 (not shown) are removed before the concrete has substantially solidified. The resulting manhole base is generally as described with respect to FIGS. 1 and 2 with the exception that the canal liner is curved rather than straight. Preferably, before the concrete has set, slopes are trowelled into the benching portions corresponding to item 24 in FIG. 1, on opposite sides of the canal, such that in use, fluid received on the benching portions is directed into the canal liner.

Second Embodiment

FIG. 8

Figure 8:
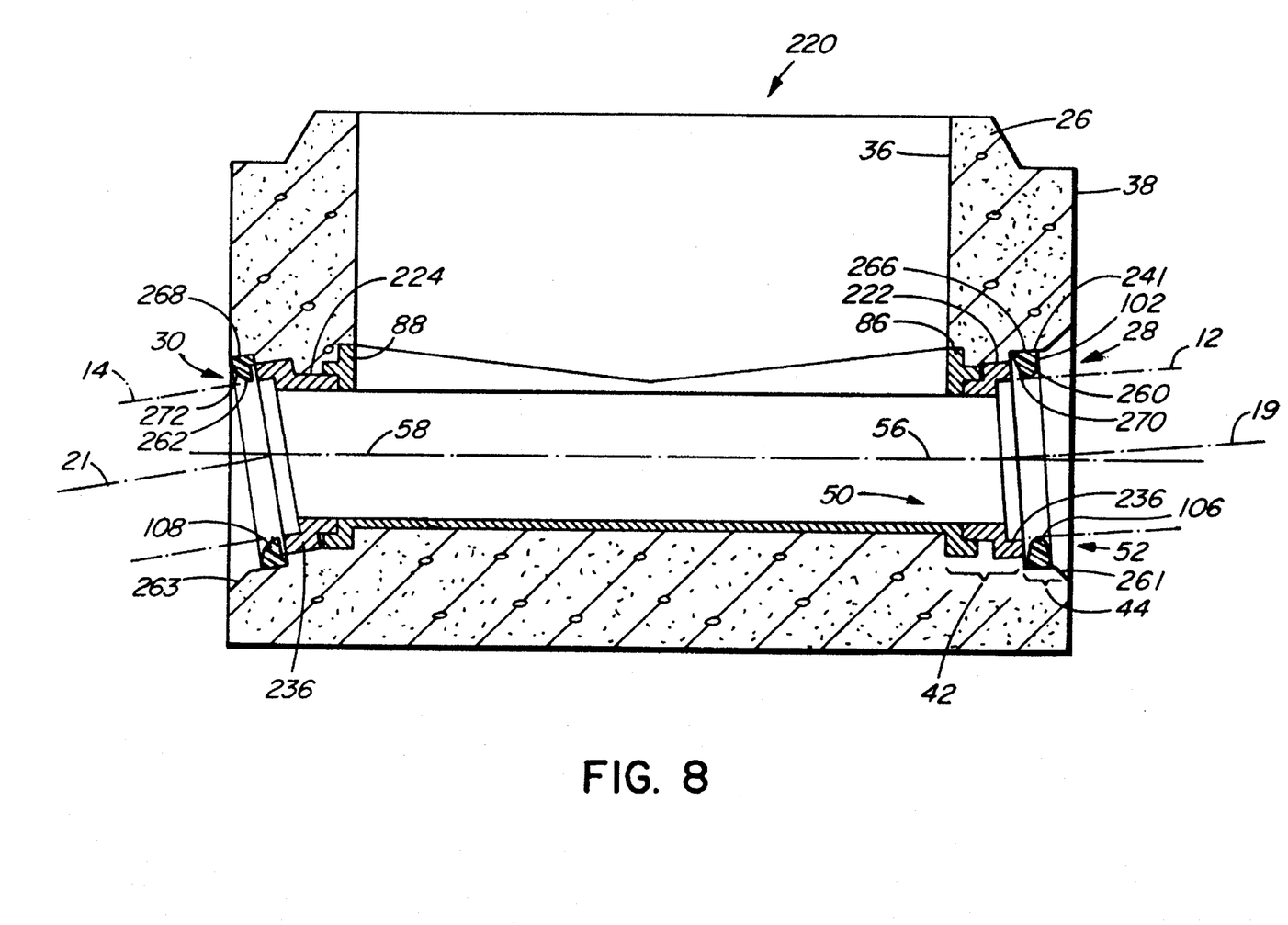
FIG. 8 is a cross sectional view of a manhole base according to a second embodiment of the invention.

Referring to FIG. 8, a manhole base according to a second embodiment of the invention is shown generally at 220. This manhole base is generally the same as that described in connection with FIGS. 1 and 2 and therefore the numerical references used in describing the apparatus depicted in FIGS. 1 and 2 have been used to identify respective similar components in FIG. 8. The manhole base of FIG. 8, however, differs from that according to the first embodiment in that it includes first and second transition conduits 222 and 224 secured to the first and second pipe connectors 86 and 88 on the end portions 68 and 70 respectively. One purpose of the first and second transition conduits is to permit the manhole base to be used with inlet and outlet pipes 12 and 14 having axes 19 and 21 which are grossly out of alignment with the inner axes 56 and 58 of the first and second passages 28 and 30 since they provide axis displacement in addition to that provided by using the bell mandrels.

FIG. 9

Figure 9:
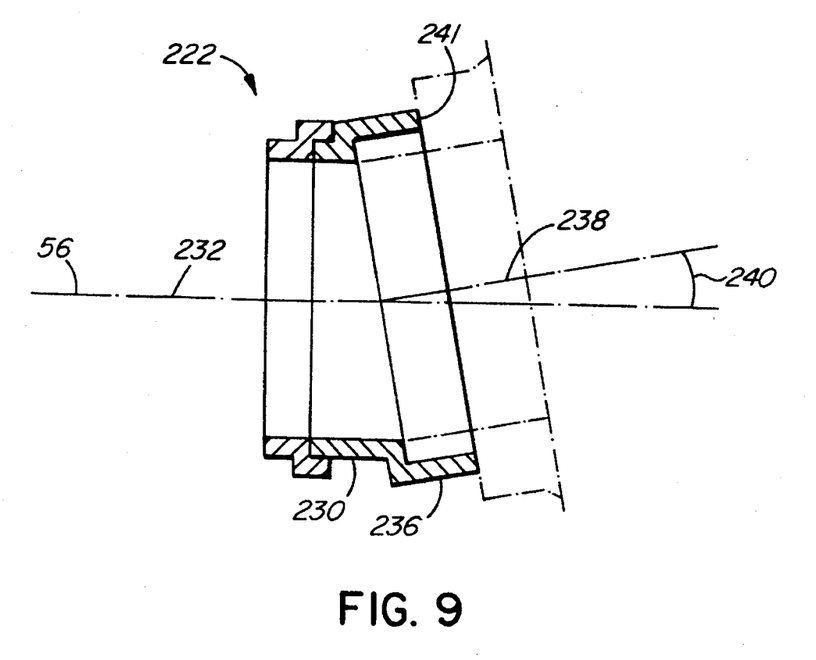
FIG. 9 is a cross sectional view of a transition conduit according to the second embodiment of the invention.

Referring to FIG. 9, the first transition conduit 222 includes a circular cylindrical liner connecting portion 230 having a first axis 232 which will be coincident with the inner axis 56 of the first passage 28 shown in FIG. 8. Referring back to FIG. 9, the transition conduit further includes a pipe bell portion 236 which acts as a pipe connecting portion of the transition conduit. The pipe bell portion has a pipe bell axis 238 which acts as a second axis disposed at an angle 240 relative to the first axis 232. In this embodiment, the angle 240 is between 0 and 15 degrees and preferably is approximately 5 degrees. The pipe bell portion has a circular edge 241 which is positioned distal to the liner connecting portion 230. Referring back to FIG. 8, the circular edge 241 is disposed between the inside and outside surfaces 36 and 38 of the annular wall portion 26 such that sufficient space 102 is provided between the circular edge 241 and the outer opening 52 to permit installation of the first O-shaped gasket 106 in the gasket seat portion 260. The inner portion 42 of the first passage 28 is defined as the area between the circular edge 241 and the inner opening 50 and the outer portion 44 is defined as the area between the circular edge and the outer opening 52. Hence the first O-shaped gasket is installed in the outer portion 44.

FIG. 10

Figure 10:
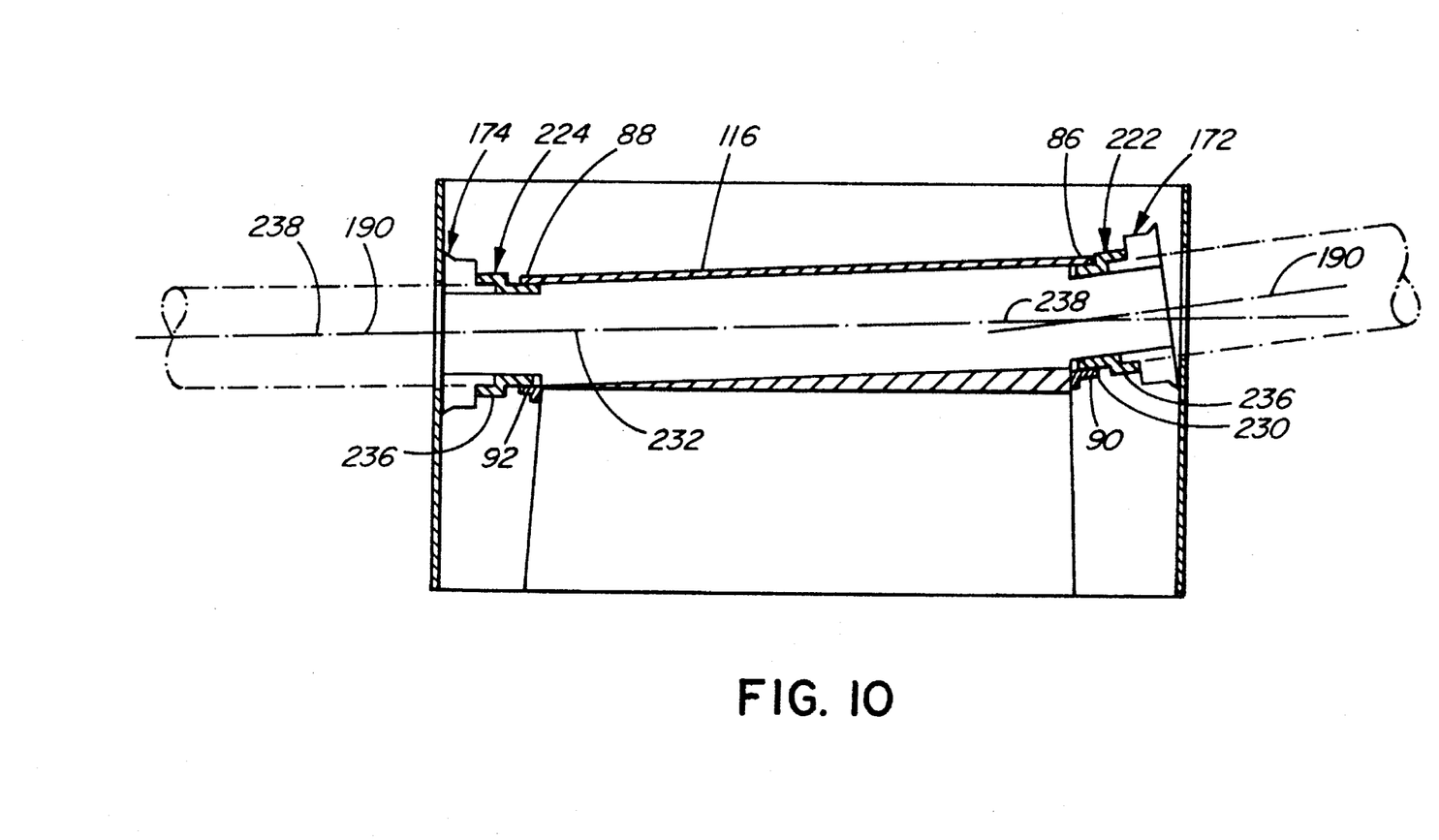
FIG. 10 is a cross sectional view of a canal liner and transition conduit secured to an inside form according to a method of making a manhole base according to a second embodiment of the invention.

Referring to FIG. 10, a manhole base according to the second embodiment of the invention is made by employing the construction method described in connection with the first embodiment with the exception that prior to inserting the bell mandrels, the transition conduits 222 and 224 are inserted into the first and second pipe connectors 86 and 88 and rotated to relative thereto until the pipe bell axes 238 are disposed at desired orientations relative to the canal liner 116. Then, an adhesive is applied to the liner connecting portions 230 of the transition conduits 222 and 224 and the liner connecting portions are inserted into the flared cylindrical pipe receiving portions 90 and 92 of the canal liner 116. The adhesive secures the transition conduits to the canal liner and forms a watertight seal therebetween.

In this embodiment, the pipe bell axis 238 of the second transition conduit 224 is aligned with the first axis 232.

Next, bell mandrels 172 and 174 having shapes as described above are inserted into respective pipe bell portions 236 of the first and second transition conduits respectively and are rotated until the desired alignment of the transition axes (190 in FIG. 6) is achieved. The first and second bell mandrels are then secured to the canal liner using the tie straps as described with respect to the first embodiment. The remaining steps of manufacture remain the same as described above.

The resulting manhole base is as described above with respect to FIG. 8. Since the first and second axes are disposed at an angle relative to each other, it is possible to permit a connecting pipe having an axis not in alignment with the axes 69 and 71 of the end portions 68 and 70 to be connected to the canal liner. This makes the manhole base more versatile than prior art manhole bases.

The above methods provide ways of forming a manhole base which is resistant to ingress and corrosion due to ground water. The canal liner described herein, a plurality of transition conduits having various angular orientations and a plurality of bell mandrels having a plurality of angular orientations can be shipped to a job site at less cost than shipping an entire manhole base. Thus manhole bases need not be manufactured at a plant specifically designed for that purpose, but rather can be manufactured at a job site where measurements can be taken accurately and the manhole base can be custom made to fit the application. This reduces lead time for acquiring manholes for a jobsite and reduces the final cost of a project. In addition, it will be appreciated that the bell mandrels can be re-used resulting in further time saving and cost benefits.

While specific embodiments of the invention have been described and illustrated, such embodiments should be considered illustrative of the invention only and not as limiting the invention as construed in accordance with the accompanying claims.

What is claimed is:

1. A manhole base comprising:
  a) a benching portion;
  b) an annular wall portion surrounding the benching portion and extending axially therefrom, the annular wall portion having inside and outside surfaces;
  c) at least two angularly spaced apart passages extending through the annular wall portion, each passage having inner and outer portions respectively, the inner and outer portions being disposed within the annular wall portion, the inner portions having respective inner openings in the inside surface and the outer portions having respective outer openings in the outer surface, the inner and outer openings being in communication with their respective passages;
  d) at least one canal in the benching portion for connecting at least two of said passages in communication with each other, said canal having an open top portion;
  e) a canal liner having an open canal portion lying in said canal and end portions lying in respective inner portions of respective passages, said end portions being in communication with said canal portion;
  f) pipe connectors connected to respective end portions of the canal liner for connecting pipes to respective said end portions of the canal liner, said pipe connectors having respective circular edges disposed between said inside and outside surfaces of said annular wall portion such that sufficient space is provided between said circular edges and said outer opening to permit installation of gaskets in said outer openings for sealing areas between connecting pipes connected to said pipe connectors and said manhole base such that in use, ground water is prevented from contacting said circular edges.

2. An apparatus as claimed in claim 1 wherein said end portions of said canal liner have cylindrical pipe receiving portions, said circular edges being on said cylindrical pipe receiving portions.

3. An apparatus as claimed in claim 2 wherein said pipe connectors include said cylindrical pipe receiving portions.

4. An apparatus as claimed in claim 3 wherein said cylindrical pipe receiving portions have enlarged pipe bell portions for receiving end portions of respective connecting pipes such that fluid flow in said connecting pipes is substantially undisturbed during passage from said connecting pipe to said canal liner.

5. An apparatus as claimed in claim 1 further including at least one transition conduit connected to one of said end portions, said transition conduit having a liner connecting portion and a pipe connecting portion respectively, the liner connecting portion having a first axis and the pipe connecting portion having a second axis, the first and second axes being disposed at an angle relative to each other to permit a connecting pipe having an axis not in alignment with the axis of said canal liner to be connected to said canal liner.

6. An apparatus as claimed in claim 5 wherein at least one of said passages has an outer portion which is disposed at an angle relative to said inner portion such that said outer portion of said passage is operable to receive an end portion of a pipe which is not in axial alignment with the axis of said canal portion.

7. An apparatus as claimed in claim 6 wherein said circular edge is located on said pipe connecting portion of said transition conduit.

8. An apparatus as claimed in claim 1 wherein said canal portion of said canal liner has first, second third and fourth upstanding edges defining a rectangular opening in said canal portion.

9. An apparatus as claimed in claim 8 wherein said canal liner has first and second laterally extending flanges extending laterally outwardly from the canal portion and embedded in said benching portion of said manhole base.

10. A sewer system node comprising:
  a) an inlet pipe having an inlet end portion;
  b) an outlet pipe having an outlet end portion;
  c) a manhole including a manhole base comprising:
    i) a benching portion;
    ii) an annular wall portion surrounding the benching portion and extending axially therefrom, the annular wall portion having inside and outside surfaces;
    iii) first and second angularly spaced apart passages extending through the annular wall portion, each passage having inner and outer portions respectively, the inner and outer portions being disposed within the annular wall portion, the inner portions having respective inner openings in the inside surface and the outer portions having respective outer openings in the outer surface;
    iv) at least one canal in the benching portion for connecting at said first and second passages in communication with each other, said canal having an open top portion;
    v) a canal liner having an open canal portion lying in said canal and end portions lying in respective inner portions of respective passages, said end portions being in communication with said canal portion;
    vi) first and second pipe connectors connected to the first and second end portions of the canal liner respectively, for connecting said inlet and outlet end portions of the first and second pipes respectively, to the canal liner, the pipe connectors having respective circular edges disposed between said inside and outside surfaces of said annular wall portion such that sufficient space is provided between said circular edges and respective outer openings to permit installation of gaskets in said outer openings for sealing areas between said inlet and outlet end portions and said manhole base such that in use, ground water is prevented from contacting said circular edges.

11. An apparatus as claimed in claim 10 further including first and second gaskets disposed in said first and second passages respectively, between said respective circular edges and said outer wall and extending about said inlet end portion and said outlet end portion respectively to prevent ingress of fluid between said inlet end portion and the first passage wall and between said outlet end portion and said second passage wall respectively.

\* \* \* \* \*